A. LUBAN.
HEATING OR STEAMING APPARATUS.
APPLICATION FILED JAN. 21, 1918.

1,301,469.

Patented Apr. 22, 1919.
2 SHEETS—SHEET 1.

WITNESSES:
Fredk. H. W. Fraentzel
Eva E. Desch

INVENTOR:
Alexander Luban
BY
Fraentzel and Richards,
ATTORNEYS.

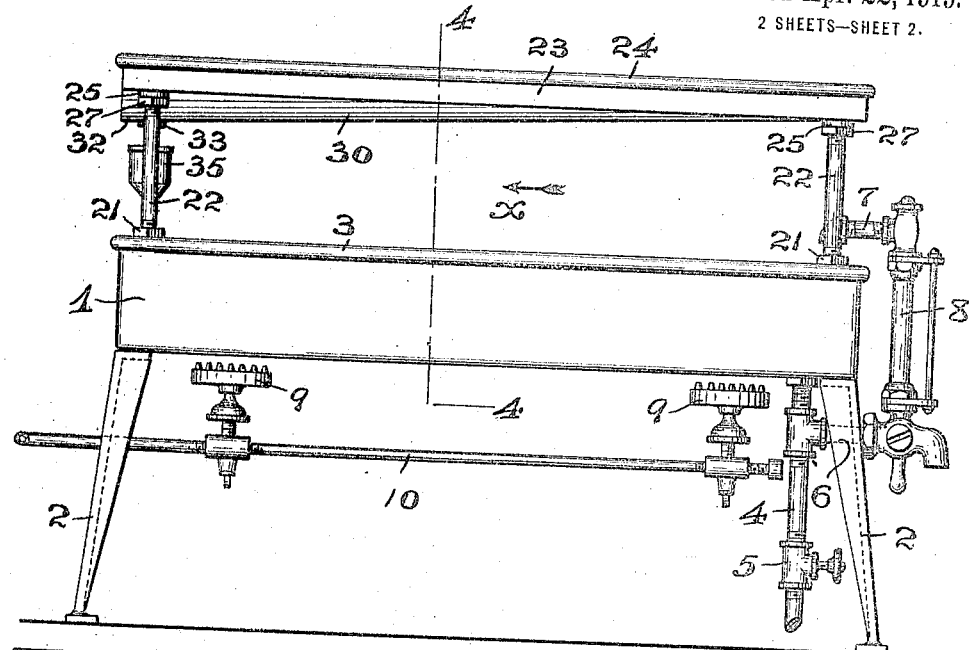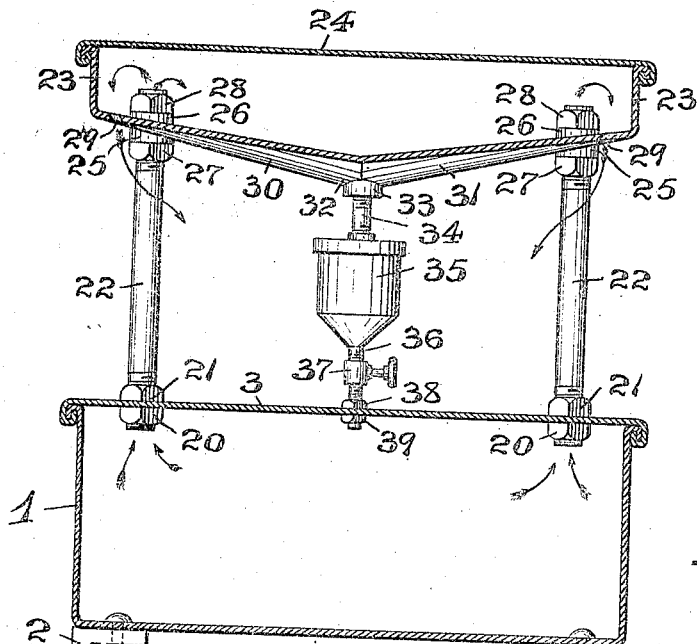

UNITED STATES PATENT OFFICE.

ALEXANDER LUBAN, OF NEWARK, NEW JERSEY.

HEATING OR STEAMING APPARATUS.

1,301,469.   Specification of Letters Patent.   Patented Apr. 22, 1919.

Application filed January 21, 1918. Serial No. 212,884.

*To all whom it may concern:*

Be it known that I, ALEXANDER LUBAN, a citizen of the United States, residing at Newark, in the county of Essex and State of New Jersey, have invented certain new and useful Improvements in Heating or Steaming Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in steaming tables; and, the present invention relates, more particularly, to a novel heating or steam-table, for use in the kitchens of restaurants, hotels, and the like, where it is necessary to maintain dishes in a warm condition, and where it is often a great necessity to keep the food placed upon dishes in a warm condition before they can be served, due to occurring and unforeseen delays in serving the patron or patrons in the dining room.

The present invention, therefore, has for its principal object to provide in connection with a heating or steam-table upon which dishes, with or without food, are placed for maintaining the same in a warm state, an auxiliary device arranged to discharge moist steam, or the like, directly upon the dishes containing food, so that the food is maintained in a properly heated and palatable condition, and is prevented from drying out and becoming unsavory as is often the case with the usual heating or steam tables, due to excessive dry heat and unforeseen delays in serving the food or courses of food to the patron or patrons.

The present invention has for its further object to provide a novel and simply constructed heating apparatus of the general character hereinafter set forth, which is most efficient for the purposes stated, but is also efficient in its operation, requiring less heat in maintaining the proper heated and palatable condition of the food placed upon the plates and other dishes mounted upon the main supporting and heating member of the steam-table.

Other objects of the present invention not at this time more particularly enumerated will be clearly understood from the following detailed description of the present invention.

With the various objects of the present invention in view, the said invention consists, primarily, in the novel heating or steam-table hereinafter more fully set forth; and, the invention consists, furthermore, in the novel arrangements and combinations of the various devices and parts, as well as in the details of the construction of the said parts, all of which will be more fully described in the following specification and then finally embodied in the clauses of the claim which is appended to and which forms an essential part of the said specification.

The invention is clearly illustrated in the accompanying drawings, in which:—

Fig. 3 is a side elevation of a heating apparatus or steam-table, illustrating a slight modification, but still embodying the principles of the present invention, and Fig. 4 is a transverse vertical section of the same, said section being taken on line 4—4 in said Fig. 3, looking in the direction of the arrow *x*, and said view being made on an enlarged scale.

Similar characters of reference are employed in the said above described views, to indicate corresponding parts.

Figure 1:
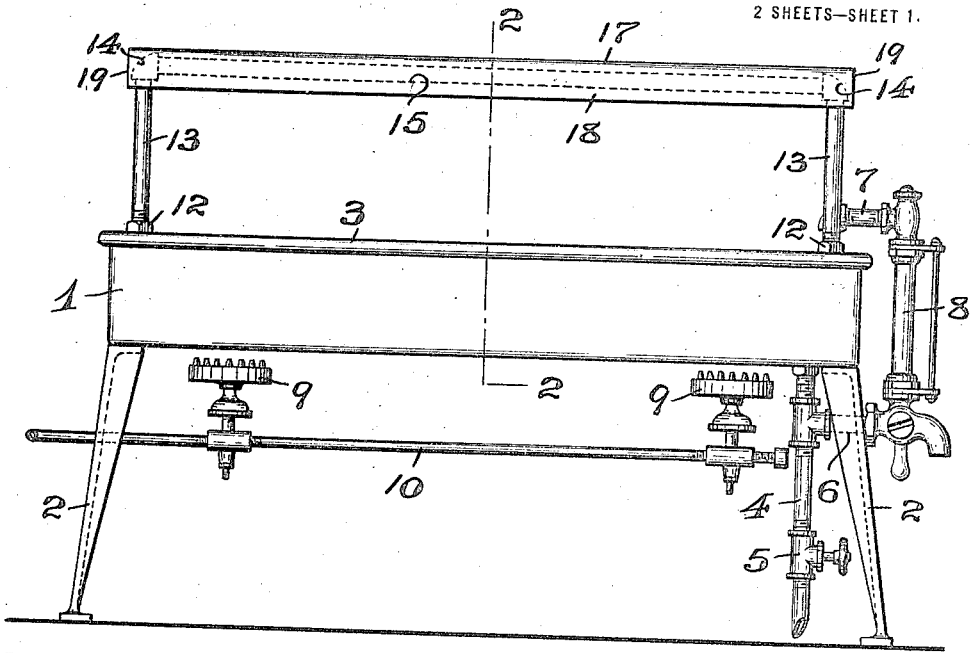
Figure 1 is a side elevation of a heating apparatus or steam-table showing one embodiment of the principles of the present invention.

Referring now to the several figures of the drawings, the reference-character 1 indicates a suitably formed and suitably shaped tank or receptacle which may be suitably mounted upon suitably-shaped legs or standards, as 2, or any other suitable supporting means may be employed. Suitably secured upon the said tank or receptacle 1 is a cover, as 3, providing a heating plate upon which the dishes, either with or without food, are to be placed.

Suitably connected with the body of the said tank or receptacle, and preferably with the bottom of the same, is an inlet tube or pipe 4, which may be provided with a stopcock or shut-off 5, for conveying a liquid, as water, into the said tank or receptacle to be heated therein and to generate steam.

Suitably connected with said tube or pipe 4 is a pipe 6, and suitably connected with the top or cover 3, or other suitable portion of the main body of the tank or receptacle, is another pipe 7, a water gage or glass 8 suitably connecting the said pipes 6 and 7, serving as a means to indicate the height of the water within said tank or receptacle 1.

One means of heating the water within said tank or receptacle, to generate steam, is by means of suitable burners, as 9, which are suitably connected with a fuel-supplying pipe, as 10.

It will be understood, however, that these burners 9 and supply-pipe 10 may be dispensed with in some cases, and instead of supplying water, which is to be heated, into the said tank or receptacle 1, the pipe 4 may be employed for conveying live steam, as a heat-producing medium, directly into said tank or receptacle.

Suitably connected with the top cover, or plate 3, by means of lock-nuts, as 11 and 12, are pipe-like standards, as 13, said standards carrying upon their upper end-portions elbows 14, or other suitable means, for connecting with each pair of standards 13, at the respective ends of the top, cover, or plate 3, longitudinally extending pipes or ducts 15. These pipes or ducts 15, as will be seen from an inspection of Fig. 2 of the drawings, are each provided with a series of suitably located and angularly disposed outlets or perforations, as 16, from which the moist steam, generated within the tank or receptacle 1, or directly conveyed into the same, as above stated, escapes and is forced downward in clouds toward the central portions of the cover, top, or plate 3, upon which the dishes, with or without food, are placed, so as to keep the said dishes in a properly moistened and warmed state, to prevent the drying out and unsavory condition of any food upon the said dishes.

To conserve the escaping steam, and to maintain the heat directly above the said top, cover, or plate 3, and about the dishes placed thereon, there may be mounted upon the said pipes or ducts 15 a suitably formed hood in the form of a shell-like body comprising a top 17, a pair of longitudinally extending sides or flanges 18 and a pair of laterally extending end-flanges or members 19, although it will be clearly evident that any other form and construction of hood or top-cover may be employed, if desired.

In lieu of the pipe-like standards 13, the pipes or ducts 15, and the hood or top cover hereinabove described and shown in the construction illustrated in said Figs. 1 and 2 of the drawings, as indicated in Figs. 3 and 4, there may be secured to the top, cover, or plate 3 of the main receptacle or tank 1, by means of lock-nuts 20 and 21, or otherwise, pipe-like standards, as 22, having their upper end-portions extending into an auxiliary tank or receptacle, as 23, which is suitably closed by means of a cover or plate 24, and the said standards 22 being secured to the bottom of said tank or receptacle 23, by means of suitably shaped washers, as 25 and 26, and the lock-nuts 27 and 28, as clearly illustrated in said Fig. 4 of the drawings.

Of course it will be understood, that any other suitable means may be employed for securing the respective end-portions of the standards 22 to the main tank or receptacle 1 and to the auxiliary tank or receptacle 23.

In order to take care of the drip or water, due to the condensation of the steam within the said tank or receptacle 23, while the steam for heating the dishes escapes through a series of outlets, holes or perforations 29 in the bottom of the tank, preferably near the longitudinally extending marginal edge-portions of said bottom, the said bottom tapers downwardly toward the central portions of the receptacle or tank, as at 30 and 31, see Fig. 4 of the drawings, and toward one end of the said tank or receptacle, as at 32, and as indicated more particularly in Fig. 3. At or near said lowest portion of the said bottom of the tank or receptacle, the said bottom has a suitable outlet, as 33, with which is connected a pipe 34, leading into a suitably formed receiver 35 in which the water of condensation is collected. Connected with said receiver 35 is an outlet-pipe 36 in which is located a stop-cock or shut-off 37, the said pipe 36 leading into the main tank or receptacle 1, and being suitably secured in place by means of lock-nuts 38 and 39, or other suitable fastening means.

Figure 2:
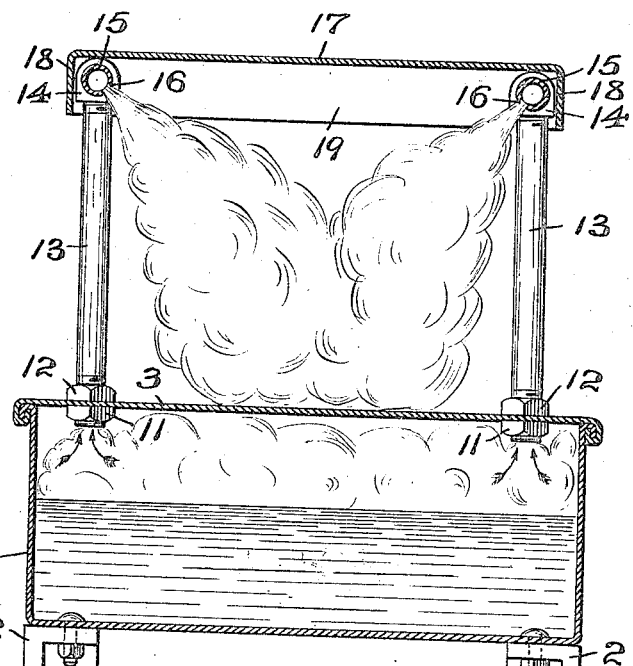
Fig. 2 is a vertical cross-section of the same, said section being taken on line 2—2 in said Fig. 1, and said view being made on an enlarged scale.

From an inspection of Fig. 4 it will be seen, that the steam will pass from the said tank or receptacle 1, in the direction of the arrows, into and through the hollow standards or pipes 22, and therefrom into the auxiliary tank or receptacle 23, the steam finally passing in the direction of the arrows into and from the angularly disposed outlets, holes or perforations 29, the steam being deflected downwardly and toward the central portions of the top, cover, or table 3, in clouds, in the manner described in connection with the construction illustrated in Figs. 1 and 2 of the drawings, and for the same purposes hereinafter stated.

Of course, I am fully aware, that changes may be made in the general arrangements and combinations of the several devices and parts, as well as in the details of the construction of the said parts, without departing from the scope of the present invention as set forth in the foregoing specification, and as defined in the clauses of the claim which are appended to the said specification. Hence, I do not limit myself to the exact arrangements and combinations of the devices and parts as described in the said specification, nor do I confine myself to the exact details of the construction of the said parts as illustrated in the accompanying drawings.

I claim:—

1. In an apparatus of the character specified, a receptacle adapted to contain a heating medium, a portion of said receptacle providing a table for the placing of dishes thereon, hollow supporting and heat-medium conveying standards connected with and in communication with the interior of said receptacle, and means mounted upon said standards for conveying the heating medium from said receptacle and standards in a downward direction toward and upon said table.

2. In an apparatus of the character specified, a receptacle adapted to contain a heating medium, a portion of said receptacle providing a table for the placing of dishes thereon, hollow supporting and heat-medium conveying standards connected with and in communication with the interior of said receptacle and means mounted upon said standards for conducting the heating medium downwardly and angularly toward and upon the central portions of the table.

3. A heating apparatus comprising a receptacle adapted to contain a heating medium, a portion of said receptacle providing a table for the placing of dishes thereon, hollow supporting and heat-medium conveying standards connected with and in communication with the interior of said receptacle, and steam-conveying pipes connected with said hollow standards, said conveying pipes being provided with outlets.

4. A heating apparatus comprising a receptacle adapted to contain a heating medium, a portion of said receptacle providing a table for the placing of dishes thereon, hollow supporting and heat-medium conveying standards connected with and in communication with the interior of said receptacle, and steam-conveying pipes connected with said hollow standards, said conveying pipes being provided with a plurality of angularly disposed outlet-perforations for conducting the heating medium downwardly and angularly toward and upon the central portions of the table.

5. A heating apparatus comprising a receptacle adapted to contain a heating medium, a portion of said receptacle providing a table for the placing of dishes thereon, hollow supporting and heat-medium conveying standards connected with and in communication with the interior of said receptacle, and steam-conveying pipes connected with said hollow standards, said conveying pipes being provided with outlets, and a hood mounted upon said steam-conveying pipes.

6. A heating apparatus comprising a receptacle adapted to contain a heating medium, a portion of said receptacle providing a table for the placing of dishes thereon, hollow supporting and heat-medium conveying standards connected with and in communication with the interior of said receptacle, and steam-conveying pipes connected with said hollow standards, said conveying pipes being provided with a plurality of angularly disposed outlet-perforations for conducting the heating medium downwardly and angularly toward and upon the central portions of the table, and a hood mounted upon said steam-conveying pipes.

7. A heating apparatus comprising a receptacle, a portion of said receptacle providing a table for the placing of dishes thereon, an inlet-pipe connected with said receptacle for conveying a heating medium into the same, an indicator connected with said pipe and with a portion of said receptacle, hollow supporting and heat-medium conveying standards connected with said table and in communication with the interior of said receptacle, and means mounted upon said standards for conveying the heating medium from said receptacle and standards in a downward direction toward and upon said table.

8. A heating apparatus comprising a receptacle, a portion of said receptacle providing a table for the placing of dishes thereon, an inlet-pipe connected with said receptacle for conveying a heating medium into the same, an indicator connected with said pipe and with a portion of said receptacle, hollow supporting and heat-medium conveying standards connected with said table and in communication with the interior of said receptacle, and steam-conveying pipes connected with said standards, said conveying pipes being provided with outlets.

9. A heating apparatus comprising a receptacle, a portion of said receptacle providing a table for the placing of dishes thereon, an inlet-pipe connected with said receptacle for conveying a heating medium into the same, an indicator connected with said pipe and with a portion of said receptacle, hollow supporting and heat-medium conveying standards connected with said table and in communication with the interior of said receptacle, and steam conveying pipes connected with said standards, said conveying pipes being provided with a plurality of angularly disposed outlet-perforations for conducting the heating medium downwardly and angularly toward and upon the central portions of the table.

10. A heating apparatus comprising a receptacle, a portion of said receptacle providing a table for the placing of dishes thereon, an inlet-pipe connected with said receptacle for conveying a heating medium into the same, an indicator connected with said pipe and with a portion of said receptacle, hollow supporting and heat-medium conveying standards connected with said table and in communication with the interior of said receptacle, and steam-conveying pipes connected with said standards, said conveying pipes being provided with outlets, and a hood mounted upon said steam-conveying pipes.

11. A heating apparatus comprising a receptacle, a portion of said receptacle providing a table for the placing of dishes thereon, an inlet-pipe connected with said receptacle for conveying a heating medium into the same, an indicator connected with said pipe and with a portion of said receptacle, hollow supporting and heat-medium conveying standards connected with said table and in communication with the interior of said receptacle, and steam-conveying pipes connected with said standards, said conveying pipes being provided with a plurality of angularly disposed outlet-perforations for conducting the heating medium downwardly and angularly toward and upon the central portions of the table, and a hood mounted upon said steam-conveying pipes.

In testimony that I claim the invention set forth above I have hereunto set my hand this 15th day of January, 1918.

ALEXANDER LUBAN.

Witnesses:
FREDK. C. FRAENTZEL,
FREDK. H. W. FRAENTZEL.

Copies of this patent may be obtained for five cents each, by addressing the "Commissioner of Patents, Washington, D. C."